United States Patent [19]

Nichols et al.

[11] 3,745,226

[45] July 10, 1973

[54] SHIELDED ENCLOSURE

[75] Inventors: Frederick J. Nichols, Los Angeles; Carl T. Luce, Woodland Hills; James C. Senn, Westlake Village, all of Calif.

[73] Assignee: Lectro Magnetics, Inc., Los Angeles, Calif.

[22] Filed: Apr. 5, 1971

[21] Appl. No.: 131,271

Related U.S. Application Data

[63] Continuation-in-part of Ser. No. 782,915, Dec. 11, 1968, abandoned.

[52] U.S. Cl. 174/35 MS, 174/35 GC, 287/189.36 F

[51] Int. Cl. .......... H05k 9/00

[58] Field of Search .......... 174/35 MS, 35 GC; 289/189.36 C, 189.36 D, 189.36 F; 287/20.92 C, 20.92 D, 20.92 Y

[56] References Cited

UNITED STATES PATENTS

| | | | |
|---|---|---|---|
| 2,682,322 | 6/1954 | Bloedow | 287/189.36 F |
| 2,838,592 | 6/1958 | Feketics | 174/35 MS |
| 3,340,587 | 9/1967 | Beyer | 174/35 MS UX |
| 3,364,298 | 1/1968 | Peters | 174/35 MS |
| 3,518,355 | 6/1970 | Luce | 174/35 MS |

*Primary Examiner*—Darrell L. Clay
*Attorney*—Smyth, Roston & Pavitt

[57] ABSTRACT

A shielded room is constructed of frame tubes and shielding panels are welded to the tubes when extending into a corner, but the panels are otherwise releasably clamped in pairs to an outwardly extending surface of a tube. Clamp panels and tube provide smooth magnetic transition between the panels clamped to the same tube. Tubes are releasably joined where the joint can be covered by integral paneling extending over the joint. A special door frame panel coacts with a door to provide broad contact and waveguide sealing when closed.

3 Claims, 11 Drawing Figures

INVENTORS
Frederick J. Nichols
Carl T. Luce
James C. Senn
By Smyth, Roston & Pavitt
ATTORNEYS INVENTORS:
Frederick J. Nichols
Carl T. Luce
James C. Senn
By Smyth, Roston & Pavitt
ATTORNEYS INVENTORS
Frederick I. Nichols
Carl T. Luce
James C. Senn
By Smyth, Roston & Pavitt
ATTORNEYS

SHIELDED ENCLOSURE

This is a continuation-in-part of application Ser. No. 782,915 filed Dec. 11, 1968, now abandoned.

The present invention relates to improvements for the construction of enclosures, shielded with regard to electro-magnetic waves. More particularly, the invention relates to the construction of demountable, radio frequency shielded rooms. An enclosure of the type to which the invention pertains must be shielded, in that the transmission of electromagnetic waves is impeded, either from the outside to the inside of the room or vice versa, as usage in the particular case may require. The shielding must be effective over a very wide range of frequencies extending from radio frequencies in the below-megacycle range up to the range of microwaves, i.e., the gigacycle range.

It is, of course, possible to provide a shielded enclosure with sufficiently thick wall material defining and extending as an integral construction all around the space to be enclosed. However, such a construction would not be demountable. On the other hand, it is apparent that in case the enclosure or room is a demountable one, the releasable joints thereof very likely define openings for the propagation of radio waves.

The shielded enclosure constructed in accordance with the present invention is basically provided by open or closed tubing and individual sheet panels. The tubes form the frame of the enclosure, and panels are attached to the tube to complete the enclosure. Tubes and panels are releasable at least to the extent they do not extend into a corner. Frame tubes not extending along wall-to-ceiling or wall-to-floor edges of the room make contact on their own outwardly directed surface with two coplanar panels along surface margins thereof, and a clamp clamps the two panels to the tube. These two panels pertain to the same wall, to the ceiling or to the floor. Clamp and tube make good surface to surface contact with each of the two panels clamped therewith to the tube, so as to provide a contiguous, magnetically conductive path between the panels. Tubes extending along an edge of the room where a wall, for example, meets the ceiling or the floor, may be partially enveloped by an angled panel piece, thereby forming a portion of the wall and a portion of the floor or of the ceiling, as the case may be.

Frame tubes may be releasably joined end to end only in a fold of a bent panel extending as an integral shield in surface to surface contacts over the releasable joint of the tubes convering outwardly directed surface portions thereof, and covering particularly any gap between the releasably joined tubes. Tubes may be thus releasably joined so that the joint either is completely inside of the room or that the outwardly extending region of the joint is completely covered by a bent panel, while, in turn, edges of different sheets may be always clamped by an integral, magnetically conductive member to the surface of a single tube which is jointless except, possibly, for welding seams.

The door is hinged to a special door frame panel joint to the remainder of the enclosure in a manner following the rules outlined above, but having an opening provided with flanges and constructed so that the door proper, when closed, provides broad surface magnetic conduction paths between the door frame sheet and the door proper, while, in addition, waveguide attenuations are provided for around the door.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings, in which:

Figure 2:
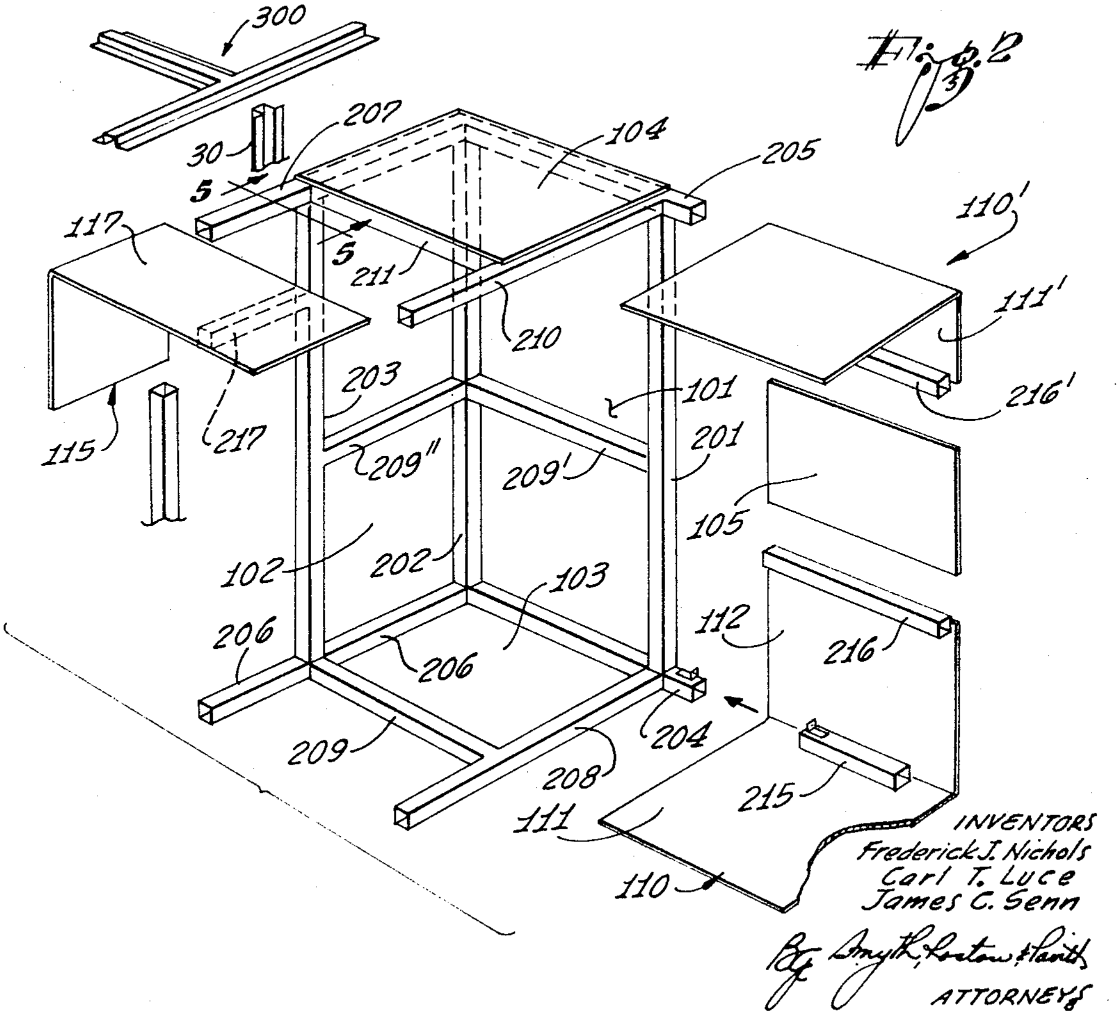
FIG. 2 is an isometric, exploded view into a corner of the shielded room shown in FIG. 1 showing several parts thereof prior to and in assembling relationship.
Figure 4:
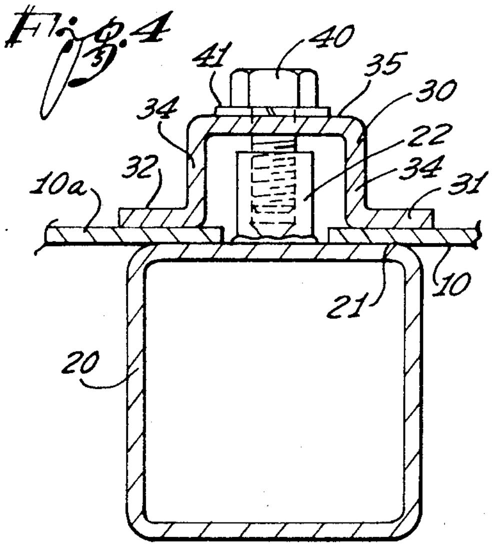
Figure 6:
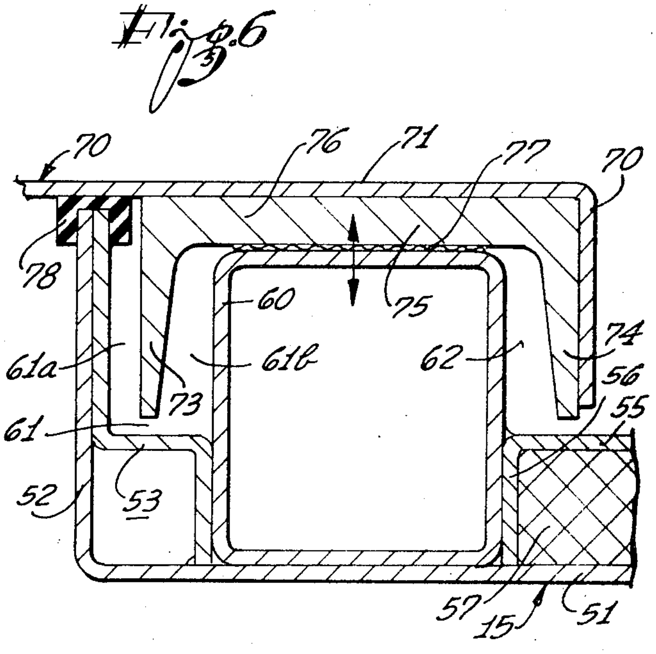
Figure 5:
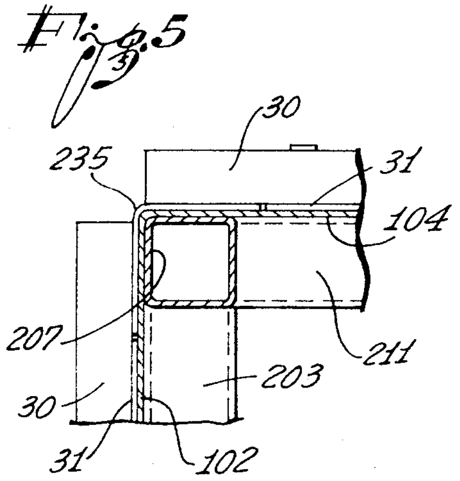
Figure 3:
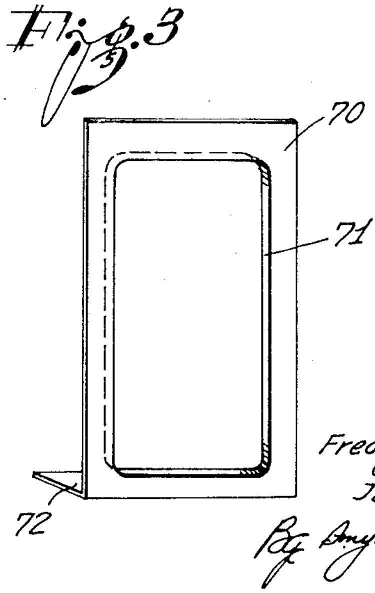
Figure 7:
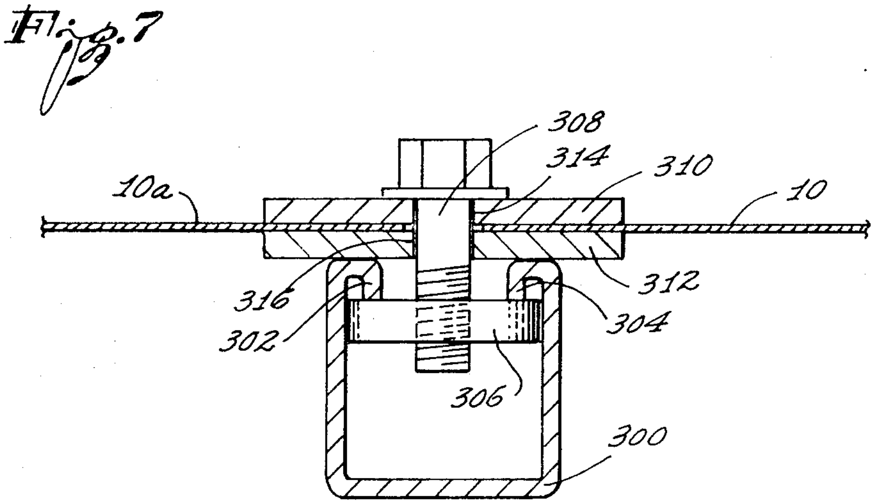
Figure 8:
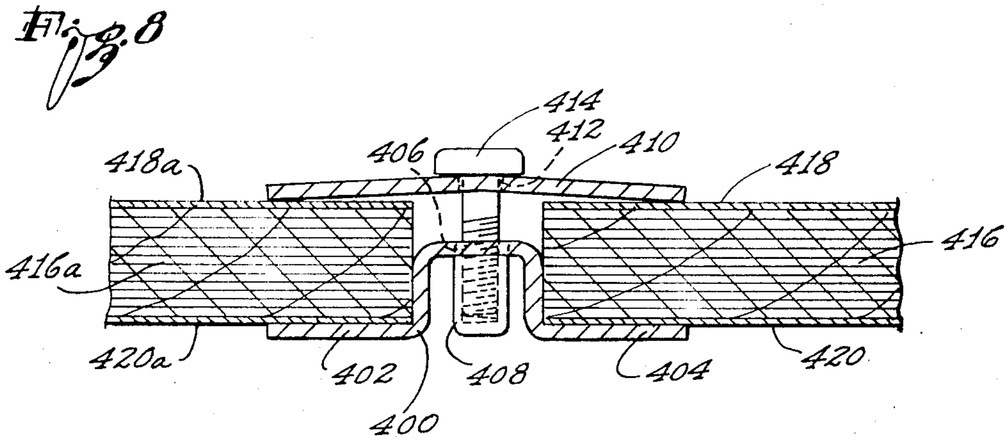
Figure 9:
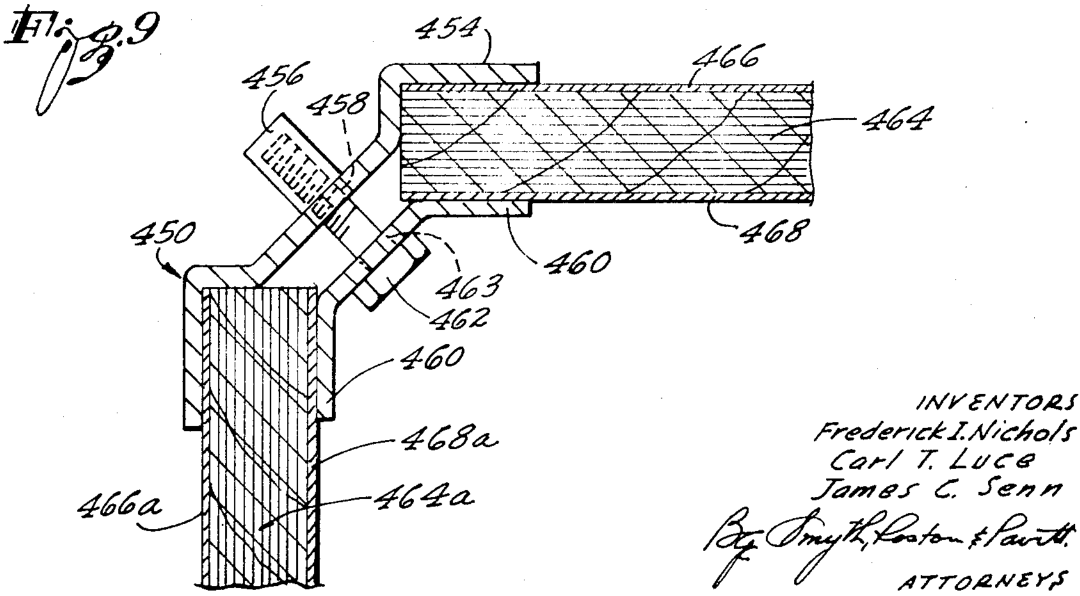

FIGS. **2*a* and 2*b* show details relevant to the illustration of FIG. 2**;

FIG. 3 illustrates a door frame panel;

FIG. 4 is a cross sectional view through a closed tube member and two sheets or panels together with a first embodiment of a clamp;

FIG. 5 is a section view along lines 5—5 of FIG. 2;

FIG. 6 is a cross sectional view through a portion of the door and door frame structure;

FIG. 7 is a cross sectional view through an open tube member and two sheets or panels together with a second embodiment of a clamp;

FIG. 8 is a cross sectional view through an open tube member and two panels together with a third embodiment of a clamp, and FIG. 9 is a cross sectional view of the clamp of FIG. 8 used to produce a corner structure.

Figure 1:
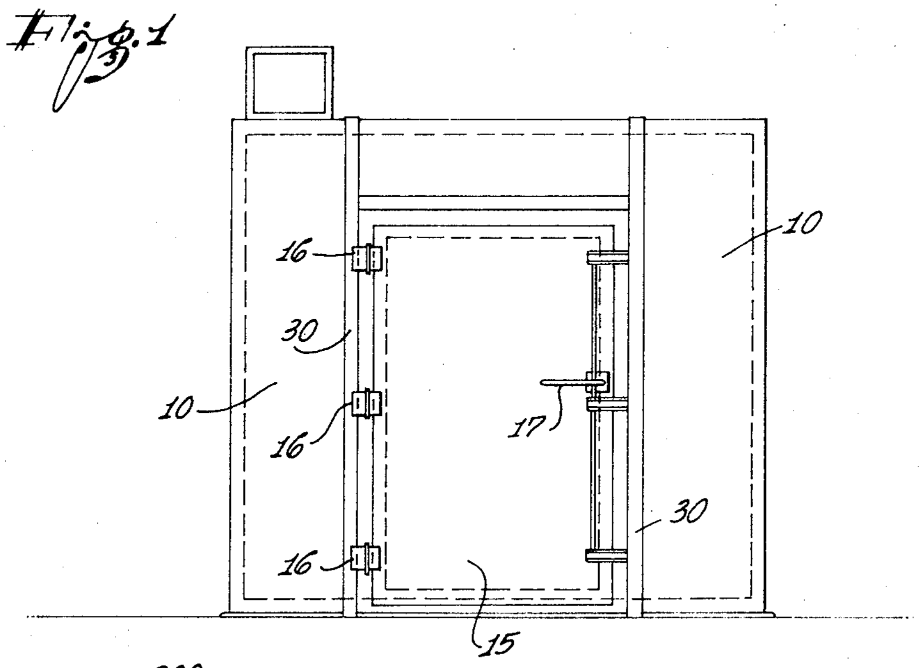
FIG. 1 illustrates a side elevation of a shielded room constructed in accordance with the principles of the present invention.

Proceeding now the detailed description of the drawings, in FIG. 1 thereof, there is illustrated a side elevation of a shielded room constructed in accordance with the present invention. The walls of this shielded room, as will be developed more fully below, and substantially also the ceiling and floor are constructed of panels, such as high grade steel panels 10. These panels are partially welded and partially or completely bolted to a frame constructed steel tube, such as 20. Bolted portions of the panels are covered by steel clamps 30 to ensure proper shielding.

The shielded room has at least one hinged door, such as 15, set into an opening which will be described more fully below with reference to FIGS. 4 and 6, there being hinges 16 which, as far as shielding is concerned, are completely outside of the room, and there is a door handle 17 cooperating with a door locking mechanism 18 to urge the door into a closed position.

Essential for the construction of the shielded room in accordance with the present invention is the construction, design and layout of the individual components employed. These building blocks, so to speak, are the panels 10, the tubing 20, and clamps 30, and subassemblies thereof. Particular configurations for these building blocks needed in order to provide an easily assemblable and dismountable shielded room, are illustrated in FIG. 2.

Turning now to FIG. 2, there is illustrated specifically a subassembly of elements constituting a corner for a shielded room. The corner is constructed, for example, from three long tubes 201, 202 and 203. Each of the tubes has an essentially square cross section with rounded corners. See tube 20 in FIG. 3. Tubes 201, etc., extend essentially over the entire height of the contemplated room structure and may be integral or welded together from smaller tubes. The tubes 201 and 202 are welded with their respective lower ends onto a bottom tube 204 and with their respective upper ends to a top tube 205, extending parallel to the tube 204. A second bottom, or floor support tube 206 is welded at right angles to tube 204 at the corner formed by tubes 204 and 202, and the third long wall tube 203 is welded with its lower end on top of and at right angles to tube 206. There is an analogous ceiling tube 207 connected through welding at right angles to the first mentioned ceiling tube 205 at the corner formed by tubes 205 and 202. A tube 208 similar to tube 206, is welded at right angles to tube 204, at right angles and at the point of connection of wall tube 201 to floor tube 204. A cross tube 209 provides stability to the structure and is interposed as a spacer between the two floor tubes 206 and 208. There are analogous ceiling tubes 210 and 211 corresponding respectively to the tubes 208 and 209. The tube structure as described thus far provides a corner frame for the shielded room.

Wall panels, such as 101 and 102, are welded, for example, to the respectively outwardly facing sides of tubes 201 and 202, on one hand, and of 202 and 203, on the other hand. A floor panel, which may be square-shaped piece 103, is welded to the downward facing side of tubes 204, 206, 208 and 209. A similar panel 104 is welded to the outwardly facing side of tubes 205, 210 and 207. This, then, completes the corner subassembly. The elements described next are suitably joined to the corner subassembly, the joining means being essential for successfully practicing the invention.

Another "building block" which can serve either as a floor or as a ceiling element is also shown in FIG. 2. An L-shaped bent panel 110 has particularly a large floor panel portion 111 and a side wall panel portion 122 integral therewith and arranged at right angles to each other. Within the fold of this angled panel piece 110 there is provided a tube 215 having length shorter than the panels 111 and 112 are wide. As indicated by the arrow, L-shaped panel 110 is placed in position so that one edge of floor panel portion 111 faces an edge of panel 103 where the margin of the latter is welded to the downwardly directed surface of tube 208. The panel 111 then abuts the same surface of tube 208 along an inwardly directed surface margin of panel 111, inward, in relation to the contemplated room. When in position, the inner fold of panel 110 partially envelopes the projecting portion of tube 204, and one edge of panel 112 faces an edge of panel 101 where the margin of the latter is welded to an outwardly directed surface portion of wall tube 201.

Figure 2A:
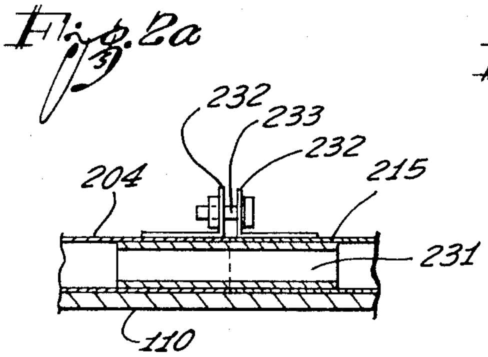

Upon so positioning element 110, the tubes 215 and 204 are placed in end to end abutment. As schematically shown in FIG. 2*a*, the two tubes are joined in that there is an inner sleeve 231 which may have been welded previously to one of the tubes and is telescopically received by the respective other one to extensively cover the joint as between the two tubes 204 and 215. L-shaped brackets, such as 232, are bolted to tubes 204 and 215 and they are bolted to each other by means of a bolt 233, to provide rigid structure as between the tubes 204 and 215. Essential is that this joint is well covered by shielding as provided by the overlapping panels 111 and 112.

Returning to FIG. 2, one can see, furthermore, that upon placing the panel element 110 in position as described, another tube 216 extending along the upper, inner margin of panel portion 112, merely abuts laterally the wall tube 201. The tube 216 may, but does not have to, be welded along the upper side of sheet 112 in the interior of its surface as far as the relative position of the room is concerned. There remains an outwardly directed surface portion of tube 216 exposed along this first portion to be clamped to a lower, inwardly directed surface portion of a panel 105. Panel 105 will be clamped to tube 201 in alignment with panel portion 112. Several panels, such as 105, will be used for covering areas bounded by four tubes whereby additional coplanar panels respectively extend also onto these tubes. They will be used for wall, floor and ceiling areas, remote for corners. A ceiling-wall panel element 110' analgous to element 110 is likewise illustrated in FIG. 2, to show completion of a vertical wall section.

The margin of the inner surface of panel 101 where extending on and along tube 201, the margin of panel 112, where extending along tube 201, the margin of the inner surface of panel 105, where extending along tube 201 and the margin of the two inner surfaces respectively of panels 112 and 105 where extending along tube 216 (one of the latter may in this particular case, be welded to tube 216, which is inconsequential in principle) all are clamped respectively to tube 201 and to the tube 216 by means of a T-shaped clamp 300, as shown in the upper left corner of FIG. 2. The stem of the T will clamp panels 105 and 112 to tube 216, and the crossbow of the T clamps panels 105 and 112 to tube 201. The details of this clamping operation will be described more fully below.

For the purposes of providing a completely shielded room, certain other "building blocks" are shown in FIG. 2; these include the L-shaped panel element 115, with a first panel portion 116 and a second panel portion 117 integral there-with and bent at right angles. They are provided to fit over a tube such as 207 to form also an outer edge of the room of the frame and to thereby provide an integral merging of wall to floor or wall to ceiling paneling. These panel portions, such as 116 and 117, are clamped to frame tubes together with panels respectively extending coplanar with these panel portions and having sides ending on similar tube sides.

Figure 2B:
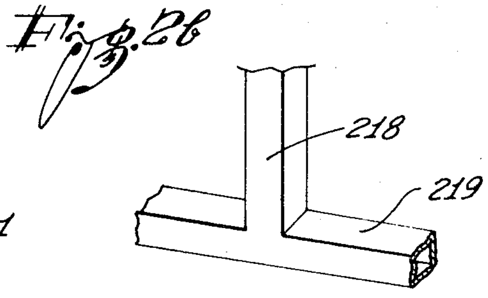

Another "building block" is a T-shaped tube (or an H-shaped frame tube) as shown in FIG. 2*b*, the portion 218 of such frame element serves as wall tube whereas cross piece 219, welded to portion 218, is destined to be placed into the folds of two juxtaposed panel elements for respective end-to-end abutment with tubes such as 215, within an outwardly gapless shielded region.

FIG. 3 illustrates another extraordinary "building block" which is a particular panel 70 serving as a door frame. This door panel has a door opening with and enveloped by an outwardly extending flange 71. Further details will be explained below with reference to FIG. 6. A floor panel portion 12 extends from panel 70 integral therewith. As can be seen from FIG. 2, the resulting fold may receive frame tube 206, whereby the floor panel portion 72 will extend to and be clamped to the downwardly directed surface of tube 208. The top of door frame panel 70 will be clamped to tube 217, and one side of panel 70 will be clamped to tube 203.

After having described the general layout of a prefabricated demountable shielded enclosure to be improved in accordance with the present invention, as well as several "build-ing blocks", it is apparent that in such an enclosure there are two potentially weak spots or areas. This refers to portions of the enclosure which cannot be joined permanently to the extent that comparatively smooth contiguous transition for electrical and magnetic field lines is available between adjacent portions of the enclosure to be joined. Potentially weak points are regions or areas in the structure where separated wall panels are releasably mounted to frame tubes. This pertains particularly to those parts of the structure where, for reasons of demountability, panels are clamped to frame tubes. Another weak spot is, of course, the door. Elsewhere, the structure offers integral wall, floor and ceiling structure, particularly in the various corner areas as explained. The clamping structure, eliminating such joints as weak spots, will be explained first; the salient features of a similarly advantageous door structure will be explained below.

In FIG. 4 is illustrated a cross sectional view through a steel tube 20, serving as a frame. The two r-f shields or wall panels 10 and 10a terminate at that tube. Tube 20 has four sides, three of which face, for example, the interior of the shielded enclosure. The fourth side 21 is outwardly directed and is provided as an engaging surface for a marginal surface portion of each of the panels 10 and 10*a*. The panels 10 and 10*a* are positioned in relation to tube 20 at its surface 21 so that there is a gap between the edges of the two panels. A plurality of weld nuts, such as 22, are welded onto tube 20, along the center line of that side 21 of the tube. The gap between the panel 10 and 10a must be at least as wide as the outer diameter of each of the weld nuts 22.

The pressure clamp 30, already introduced above, has two longitudinal flanges 31 and 32. The remainder of the pressure clamp has U-shaped profile to form a groove or channel. The side wall of that channel is formed by portions 33 and 34, and the bottom of such a groove or channel is denoted with reference numeral 35. The channel is about as deep as the weld nuts 22 are high. The channel bottom portion 35 of the pressure clamp 30 is provided with threaded apertures to respectively receive bolts 40, there being lock washers 41 clamped by the head of the bolt 40 against the outer channel bottom portion 35, to positively cover any aperture spacing or communication path between the interior of the channel of clamp 30 and the exterior thereof.

The threaded shanks of the bolts 40 are respectively received by the weld nuts. Upon tightening bolt flanges 31 and 32, clamp the panels 10 and 10a against the outwardly directed surface 21 of tube 20. These flanges broadly engage the panels over the entire length of each of them, and the adjacent surface portions on the respective other sides of the panels broadly engage surface 21 of tube 20 to provide smooth transition paths for electric and magnetic fields. It is particularly important that the areas of contact have a length, measured transverse to the extension of the tube, which is larger than a minute fraction of an inch. Possible, there may still exist minute gaps, for example, between flange 32 and panel 10*a*, or between tube 20 and panel 10, due to insufficient local clamping at some points along the possibly rather long tube 20. Such gaps operate as waveguide attenuation for short wave radiation. Moreover, each wave tending to penetrate the structure from the inside to the outside, or vice versa, has to pass through two serially arranged ones of such "waveguides", resulting in material radiation intensity or amplitude attenuation due to waveguide cutoff. For a longer wavelength, the smooth transitions provided generally ensures closed paths for magnetic field lines so that fringe radiation at edges are greatly minimized. It was found that in the range of radio frequencies the resulting attenuation exceeds 100 db, and this level is maintained even where waveguide attenuation is effective.

FIG. 5 illustrates how to deal with clamping along corners. Consider, for example, the outwardly and upwardly extending surfaces of tubes 203 and 211 in FIG. 2. Panels 102 and 104 are welded to these tubes 203 and 211 respectively; both are welded also to different sides of tube 207. Portions 116 and 117 of panel 115 are, likewise, clamped to the tubes 203 and 211 respectively, and around tube 207. There are, however, different clamps 30 involved for the two tubes 211 and 203. Employment of a 90° clamp is very impractical as proper clamping can hardly be obtained. It is, therefore, advisable to interpose here an angled sheet, such as 235, sufficiently wide to be clamped by both flanges of each of the clamping elements 30 involved, and being overlaid along short margins of sheets 103 and 104, on one hand, and of panel 115, on the other hand.

Proceeding now to the description of FIG. 6, there is illustrated the salient structure for establishing a radio frequency seal for the door. The door was referred to generally above with reference numeral 15 and is shown partially in FIG. 6. The door includes two door panels, such as 51 and 55, respectively, having angled portions 52 and 56. Panel 55 with flange 56 and the major portion of panel 51 circumscribe and enclose a space filled with an acoustic filter 57, such as fibrous urethane. Flanges 52 and 55 together with the portions of panel 51, not covered by the material 57, define a closed channel, and wall 52 extends along a reinforcing tube 60. The tubing 60 defines a rectangle and has a cross section similar to that of tubes 20. Tubing 60, therefore, has basically four straight portions forming a rectangle corresponding to the rectangular door panel 55, and is welded to flange 56, as well as to panel 51. An additional support element 53 holds tubing 60 against flange 56 and bears against flange 52 of the second door panel 51. One can specifically see that throughout the structure, as described, the several parts are joined through flat contact surfaces providing everywhere smooth transition paths for electric and magnetic field lines. Due to the structure of the particular support piece 53 a ring channel 61 is defined by that part of support 53 which abuts flange 52.

After having described the salient features of the door, we proceed to the description of the door frame. As was already outlined with reference to FIG. 3, the door frame is provided by a particular panel 70, having a flange 71 which extends around the opening for the door. A shielding element 75 of U-shaped cross section, and defining a closed channel, is mounted adjacent flange 71 to extend all around the door opening. That channel has a bottom 76 and side wall elements 73 and 74. The outer surface of bottom 76, and the outer surface of wall 74, are, for example, respectively welded to the shield panel 70, as well as to the flange 71 thereof, to provide broad, gapless contact for smooth transition of electric and magnetic field lines.

Walls 74, as well as flange 71, have a height so as to extend very close to door panel 55 when the door is closed. A gap 62 is defined between channel wall 74 and wall of tubing 60. The wall 73 extends into the ring channel 61, actually dividing that ring channel into a first portion 61a and a second portion 61b. Finger stock 77 is mounted to the inner surface of bottom 76 to engage broadly most of the surface of tubing 60 which is parallel to the several panels.

The door illustrated partially in FIG. 6 is shown in closed position. Smooth transition paths are provided for magnetic field lines between wall panel 77 and door panels 51 and 55. The gaps, such as 61*a*, 61*b* and 62, and also any gap space between the bottom 72 of the ring channel and tubing 60, serve as waveguide attenuators for short wave radiation. In order to improve the shielding characteristics of the structure, a ring channel 78 is provided to receive the edge of flange 52.

Considering directions within a section plane, as illustrated in FIG. 6, it can readily be seen that for short waves to penetrate the structure, there are at least two wave-guide attenuators between interior or exterior of the room, which are not colinear and which, when taken together, form a total waveguide of a length of several inches. Moreover, waveguide gaps 61b and 62, for example, communicate only through the very narrow gap which may remain between the very closely positioned surfaces of tubing 60 and of channel bottom 72. This latter waveguide seal has a very high cutoff frequency. Since the cutoff frequency of the waveguide structure, as established by gaps 61*a*, 61*b* and 62, is already in the megacycle range, the total attenuation for short waves is, even around the door, again greater than 100 db. For longer waves, where waveguide considerations do not play important considerations, it is essential that, as was mentioned above, there is a smooth transition between wall panel 70 and either panel 51 or 55, due to broad surface contact between the panel 70 and the channel element 75, and between the latter and the tubing 60 and from there to flange 56, as well as panels 51 and 55. Moreover, the ring channel 71, and particularly the wall portions 72 and 73 thereof, provide additional shielding as to magnetic fringe effects at or around the contact.

FIG. 7 illustrates a second embodiment of a clamping structure which may be used in place of the clamping structure of FIG. 4. In FIG. 7 an open tube member 300 is used to provide the frame of the shielded room in the same manner as tube 20 of FIG. 4. The tube 300 includes curved wall portions 302 and 304 along the open side of the tube 300. A plurality of lock nuts 306 are positioned along the tube 300 to receive a plurality of bolts 308.

The combination of the bolts 308 and lock nuts 306 are used to clamp the panel members 10 and 10*a* which form the skin of the shielded room. In order to provide additional contact area within the clamp of FIG. 7 so as to minimize radiation, bar members 310 and 312 are used to clamp the panels 10 and 10*a* therebetween. The bar members 310 and 312 have openings 314 and 316 for receiving the bolt member 308 so that the entire structure may be clamped together using the bolt members 308 in combination with the lock nuts 306.

It can be seen with reference to FIG. 7 that the structure can be put together from one side only and that access is not required to both sides of the room. This feature is also true with respect to the structure of FIG. 4. A second feature of the structures of FIG. 4 and 7 is that the blind assembly is such that there is no penetration of the bolt from the outside of the room to the inside of the room. This eliminates the problem of a loose bolt allowing RF leakage directly into the room. This leakage problem is common to most clamp together rooms using bolts that penetrate into the room since with time, the bolts work loose due to both mechanical stresses and chemical action of oxidation.

FIGS. 8 and 9 illustrate a third embodiment of a clamping structure which may be used in place of the structure of FIGS. 4 and 7. The structure of FIGS. 8 and 9 is especially useful when the panels are constructed of metal clad plywood. The structure of FIGS. 8 and 9 distributes the structural load of the room through the use of load bearing walls and the column effect of the clamping structure.

The clamping structure of FIG. 8 includes an open tube member 400 having flanges 402 and 404. The tube member 400 includes a plurality of openings 406 and with blind internally threaded inserts 408 welded or riveted into the openings 406. This blind assembly prevents R F penetrations through the inserts 408. A dished flat strip 410 having openings 412 to receive bolts 414 completes the clamping structure. The panel members are formed from plywood members 416 and 416*a* that are metal clad with metal sheets 418, 418*a*, 420 and 420*a*.

FIG. 9 illustrates a clamping structure similar to that shown in FIG. 8 but used for a corner of the shielded room. In FIG. 9 the clamp includes tube member 450 having flanges 452 and 454. Internally threaded inserts 456 are welded or riveted into openings 458 in the tube member 450 to provide for a blind assembly. Curved strip member 460 receives bolts 462 through openings 463 to cooperate with threaded inserts 456 to clamp panel members 464 and 464*a* between the flanges and the tube member 450 and the curved strip member 460.

Panel members 464 and 464*a* include a wood core clad with metal sheets 466, 466*a*, 468 and 468*a* in the same manner as the panel members shown in FIG. 8.

The structure of FIGS. 8 and 9 provides for the blind assembly as discussed above. The clamping structure of FIGS. 8 and 9 eliminates a direct R F path into the room as is present with other structures using a bolt which penetrates into the room.

In the foregoing specification there have been described the construction elements for a shielded room. The wall panels provide shielding, per se, as integral elements. They are mounted to a tube frame either through welding to an outwardly directed tube surface if another panel does not extend to the same seal tube surface, whereas coplanar panels facing edgewise and extending onto the same tube surface are clamped thereto in a manner that broad magnetic surface contact is provided through the clamping areas. Demountability is not impeded if a rectangular or square-shaped panel is welded along all four sides to a correspondingly rectangular or square-shaped tube frame portion, if welding is necessary along at least one side or edge because that edge forms a corner. Where a panel does not have to be welded to tubing for that reason, it should be clamped to permit the greatest extent of demountability. The tubes, in turn, are welded to each other, either to form long tubing, or where corners are formed by tubings meeting at right angles. Short tube sections are in parts releasably joined only where the outwardly directed joint area is or can be covered jointlessly by an integral panel. T-shaped tubes with welded stem and cross bar of the T may be practical if either the stem or the cross bar of the T is relatively short. Corresponding T clamps are provided for gapless joining of panels on such T-tubes.

The invention is not limited to the embodiments described above, but all changes and modifications thereof not constituting departures from the spirit and scope of the invention are intended to be covered by the following claims.

We claim:

1. In a shielded room constructed from magnetically conductive sheets as well as from magnetically conductive tubes the sheets positioned to form walls, floor and ceiling, the tubes being joined to form support frame for the room at the desired configuration and with the tubes including at least one flat face of continuous material and having no openings from the inside to the outside of the shielded room and with sides of juxtaposed coplanar sheets facing each other edge to edge at and on the flat face of a tube, there being means integral to the flat face of the tube for clamping such sides to the flat face of the tube to define flat surface contact areas between the sheets and the tube for providing a continuous magnetically conductive path between the sheets and the tube.

2. In a shielded room constructed from magnetically conductive sheets and from magnetically conductive tubes, the sheets positioned to form walls, floor and ceiling, the tubes being joined to form a support frame for the room at the desired configuration, the improvement comprising:

tubes along floor and ceiling edges supporting angled integral sheets forming part of the floor or ceiling and of the wall outside of a corner of the room, sheets extending to room corners being welded to the tubes defining the corner and with the other portions of the shielded room having the magnetically conductive sheets releasably retained in engaging position with the magnetically conductive tubes.

3. In a construction for shielded rooms, the improvement comprising:

an elongated member of magnetically conductive material and having at least one continuous surface of continuous material having no openings therethrough from the inside to the outside of the shielded room along the extension of the elongation and with the continuous surface of the elongated member having at least first and second flat surface portions along the extension of the elongation;

a first panel of magnetically conductive material in flat surface to surface contact at least along one edge of the panel with the first flat surface portion of the continuous surface of the member, there being means to retain the surface to surface contact;

a second panel of magnetically conductive material in flat surface to surface contact at least along one edge of the second panel with the second flat surface portion of the continuous surface of the member;

means of magnetically conductive material integral with the continuous surface of the elongated member releasably retaining at least the second panel in engaging position with the second flat surface portion of the continuous surface of the member, thereby defining at least two non-colinear waveguide r-f seals from one side to the other side of at least the second panel;

said elongated member having a plurality of nuts permanently joined to said member;

said means releasably retaining being a second elongated member of magnetically conductive material having a central portion and having flanges extending therefrom;

said flanges being in flat engagement with said first and second panels;

said central portion of said second elongated member having apertures therein aligned with the nuts;

said nuts being positioned on the elongated member between the facing edges of said first and second panels; and bolt members received in said apertures and threadably engaging said nuts for bolting said second elongated member to said elongated member thereby releasably retaining said panels with respect to said elongated member.

* * * * *